United States Patent
VonBaeckmann et al.

[11] 3,879,609
[45] Apr. 22, 1975

[54] DEVICE FOR THE DETERMINATION OF CONCENTRATIONS OF FISSILE AND/OR FERTILE MATERIALS BY MEANS OF X-RAY FLUORESCENCE SPECTROMETRY

[75] Inventors: Adolf VonBaeckmann, Bruchsal; Jürgen Neuber, Karlsruhe, both of Germany

[73] Assignee: Gesellschaft fur Kernforschung m.b.H., Karlsruhe, Germany

[22] Filed: Sept. 1, 1972

[21] Appl. No.: 285,663

[30] Foreign Application Priority Data
Sept. 20, 1971 Germany............................ 2146774

[52] U.S. Cl. ................. 250/278; 250/277; 250/273
[51] Int. Cl. .......................................... G01n 23/00
[58] Field of Search............. 250/51.5, 43.5 R, 273, 250/278, 277

[56] References Cited
UNITED STATES PATENTS
| | | | |
|---|---|---|---|
| 3,152,251 | 10/1964 | Schroeter | 250/43.5 R |
| 3,391,276 | 7/1968 | Delarue | 250/51.5 |
| 3,499,144 | 3/1970 | Juillet et al. | 250/51.5 |

*Primary Examiner*—James W. Lawrence
*Assistant Examiner*—B. C. Anderson
*Attorney, Agent, or Firm*—Spencer & Kaye

[57] ABSTRACT

In analyzing fissile and/or fertile materials in the thorium, uranium, neptunium, plutonium, americium and curium group, time and accuracy are significant factors. An automated system for rapidly analyzing these materials includes: sample preparation device in which aliquots of sample are weighed and mixed with known amounts of solution; X-ray fluorescence spectrometer; and, a central control system for controlling the operation and analyzing the data.

5 Claims, 2 Drawing Figures

DEVICE FOR THE DETERMINATION OF CONCENTRATIONS OF FISSILE AND/OR FERTILE MATERIALS BY MEANS OF X-RAY FLUORESCENCE SPECTROMETRY

The present invention relates to a device for the determination of concentrations of fissile and/or fertile materials in the thorium, uranium, neptunium, plutonium, americium and curium group in aqueous or organic solutions by means of X-ray fluorescence spectrometry.

BACKGROUND OF THE INVENTION

X-ray fluorescence analysis is largely independent of the chemical state of an element to be determined (valence, complexing action) and is not disturbed by the presence of foreign elements. This makes it suitable for the measurement of even relatively small concentrations in the presence of large amounts of spurious substances. In the most comprehensive design available so far, the familiar devices used to perform X-ray fluorescence analysis merely consists of an X-ray fluorescence spectrometer with a high voltage generator and pulse counting electronics and a sample changer into which the solutions containing the elements to be assayed are introduced individually for measurement in the X-ray fluorescence spectrometer as the samples are prepared manually in accordance with the measurement to be performed.

Preparation of the samples for measurement comprises a sequence of steps after sampling to be carried out in a laboratory. Thus, for example, in assaying a solution containing an unknown amount of uranium, a skilled and experienced worker weighs an aliquot of this solution, dilutes it, if necessary, adds it to a weighed quantity of thorium standard solution of a known concentration which was prepared and controlled in advance by the expert worker, and transfers a weighed quantity of the solution so treated into a measurement vessel. Afterwards, this measurement vessel is put into the sample changer.

If a sample is to be prepared for measurement which contains plutonium or some other toxic transuranium element, the manipulations are performed in a glove box for safety.

For calculation of each of the desired concentration levels the respective figures noted with respect to weight determination, X-ray intensities, dilution ratios etc. are brought into a relationship relative to each other on the basis of a given scheme of calculation, and the desired values are determined in this way. The calculation of concentrations by this method is very cumbersome and time consuming.

If the determination of concentrations of fissile and/or fertile materials is used to control a process, for instance a process for reprocessing spent nuclear fuels, the control values must be determined with the maximum amount of certainty to be free from any error and must be available within the shortest possible time to help avoid losses of valuable materials.

SUMMARY OF THE INVENTION

Therefore, the present invention is based on the objective of creating a device for the determination of concentrations of fissile and/or fertile materials by means of X-ray fluorescence spectrometry that can be started by semi-skilled workers and operates with a maximum amount of safety both with respect to the protection of the operators from ionizing radiation and/or toxic substances and to the control data of a process. This device is to lend itself equally well to the investigation of unirradiated materials and materials irradiated with neutrons, or materials with a high burnup, with a minimum requirement of space and time, and the concentrations resulting from the investigations are to be determined and recorded.

In the present invention, this problem is solved by a sample preparation device, which is located in a glove box and actuated electromechanically. The device is equipped with a remotely operated sample changer, an X-ray fluorescence spectrometer with a high voltage generator and pulse counting electronics. A computer controls the sample preparation device, the sample changer, and the X-ray fluorescence spectrometer by a fixed sequential program, storing the measured data and determining and recording the analytical data.

In a preferred embodiment of the present invention, the sample preparation device consists of a movable magazine which carries a multitude of disposable pipettes and transports these pipettes stepwise by remote control, a transport device which accomodates the containers that include the samples bagged into the glove box and transports them individually, a pipetting device which takes aliquot samples from the sample containers by means of the disposable pipettes, a beaker magazine with a multitude of beakers to accomodate the pipetted aliquot samples, another beaker magazine with a multitude of measuring beakers to hold the amounts of liquid to be measured, an electronic balance with a servor drive, a minimum of three beaker transport devices, a sample changer, several metering pumps with storage vessels containing reagents or diluents, a drain with a collection vessel for the amounts of liquid measured, and a waste storage system for the spent disposable pipettes and beakers. The sample preparation device is installed over the X-ray fluorescence spectrometer and connected with it by the sample changer.

The device according to the invention is used very advantageously to control the flow of fissile material in plants reprocessing spent nuclear fuels. A major advantage stems from the fact that the device can be installed in a process stream or a bypass of a process stream at only minor additional expense, for instance, a sampling device which can be operated at variable preset time intervals and could consist of a calibrated vessel with an overflow. The measurements in the X-ray fluorescence spectrometer are not hampered even by high radioactivity of the solutions. The accuracy attainable is better than 1 percent relative for concentrations around or above 100 $\mu g/g$ of solution, which makes it sufficient, for instance, for nuclear safeguards purposes. Special advantages for nuclear safeguards application are the tamperproof characteristics and the unattended operation.

The present invention will now be explained on the basis of the drawings. However, the invention is not restricted to the embodiment shown in the drawings.

DESCRIPTION OF THE PREFERRED EMBODIMENT

Figure 1:
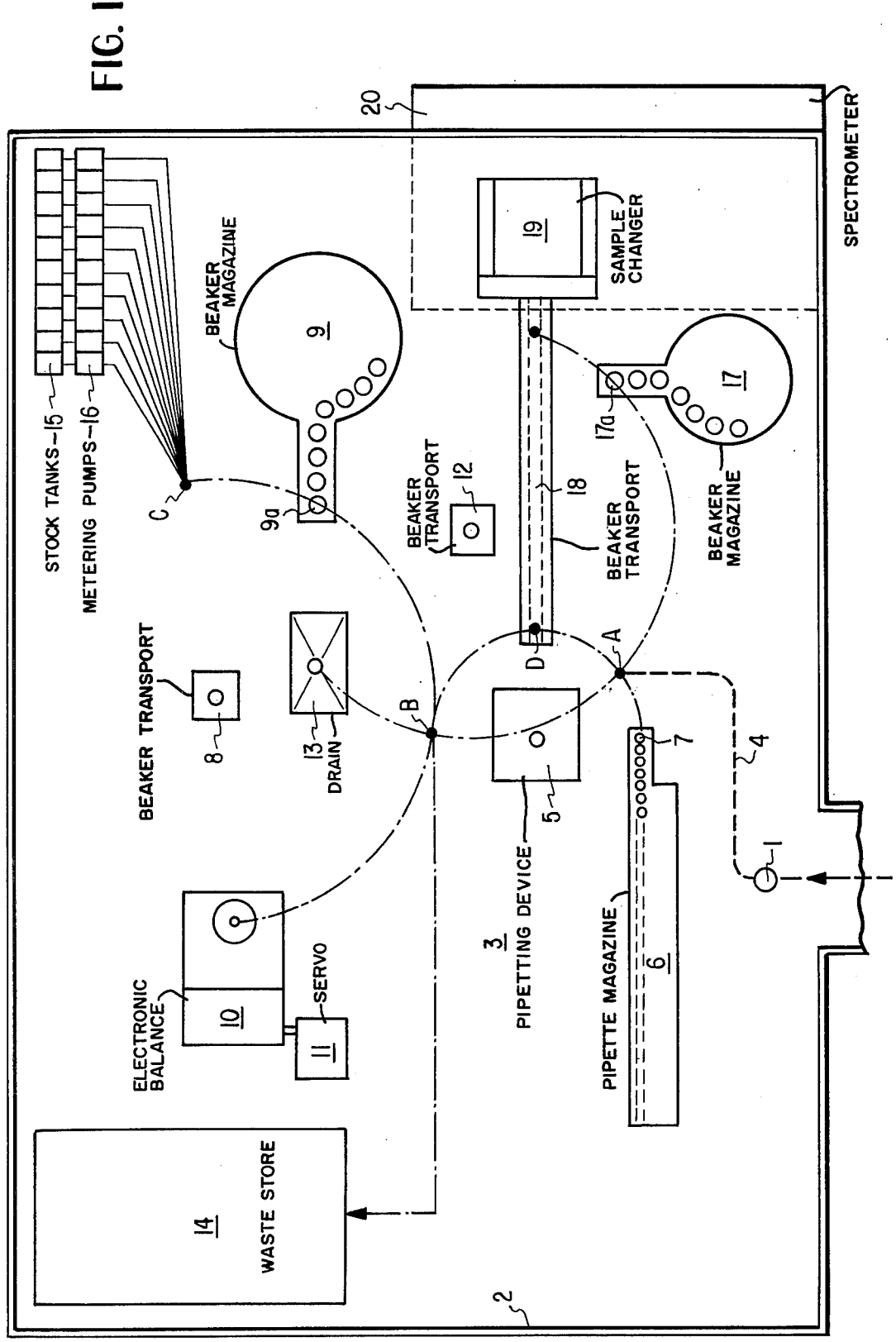
FIG. 1 is a schematic representation of a top view of the sample preparation device accomodated in a glove box, partly over the X-ray fluorescence spectrometer, of the type used, for instance, for nuclear safeguards purposes.
Figure 2:
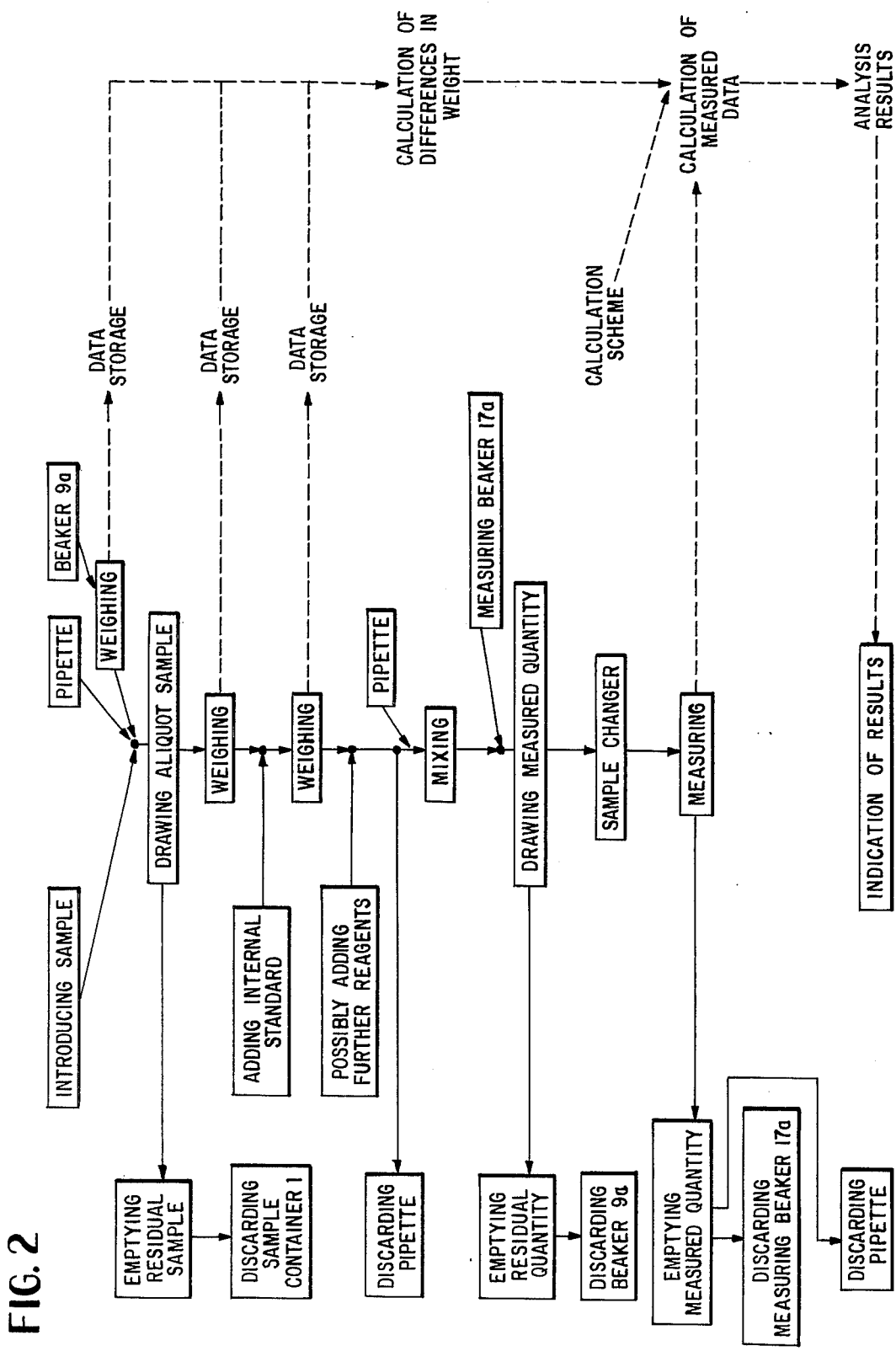
FIG. 2 shows a flowsheet of the process steps that can be used for the same application, which process steps are controlled according to a given sequential program by a control unit and controlling computer, which are not shown in the drawings, and are performed by the sample preparation device.

A sample in a container, is bagged into the glove box 2, which contains the sample preparation device 3, and taken to a position A below the pipetting device 5 by means of a container transport device 4. Approximately at the same time, the pipetting device 5 is supplied with one of the disposable pipettes 7, which can be used only once, by the movable pipette magazine 6. Also at about the same time, a beaker transport device 8 takes a beaker 9a from the beaker magazine 9 and puts this beaker in the weighing position on the dish of the electronic balance 1o, on which the beaker is weighed with a servo drive 11. The beaker transport then takes the beaker back and puts it in a position B underneath the pipetting device 5. The weight of the empty beaker is stored. Then the pipetting device 5 draws a volume from the container 1 in position A which corresponds to the pipette 7 and discharges that aliquot of a sample into the beaker 9a in position B. The beaker transport device 8 takes back the beaker and puts it in the weighing position on the balance 10. Approximately at the same time, the residual sample in the sample container 1 is taken in by means of the pipetting device 5, discharged over the drain 13, and afterwards the container 1 is bagged out again by means of the container transport device 4. After weighing, the result of which is also stored, the beaker transport device 8 transfers the beaker to a position C, where there is added to the aliquot of the sample a certain amount of the solution of a so-called "internal standard," for instance, a thorium or yttrium salt, from one of the stock tanks 15 by means of one of the metering pumps 16. The beaker 9a is again brought in the position for weighing, weighed, the weight is recorded and the required differences in weight are calculated and also stored; then the beaker is returned to position C. If necessary, other reagents or diluents from other stock tanks 15 are added by means of the respective metering pumps 16. By providing for a sufficiently large number of stock tanks 15, for instance 10 tanks and the corresponding number of metering pumps 16, standard samples can be prepared and measured on the basis of control programs which are provided in advance. The pipette 7 used for sampling is lifted and put onto a chute leading to the waste store 14, which chute is not shown on the drawing. Instead of the chute, some other transport device may be installed. The pipetting device 5 takes up another disposable pipette 7 from the magazine 6. After addition of the last amount of solution needed, the transport device 8 transfers the beaker 9a from position C to position B underneath the pipetting device 5 through which gas is introduced into the solutions by means of the new pipette 7 for homogeneous mixing of the solutions. Approximately at the same time, the beaker transport device 12 withdraws a measurement beaker 17a from the measurement beaker magazine 17 and puts it onto the beaker transport device 18 in position D underneath the pipetting device 5. The pipette 7 is used to take in the amount to be measured of the thoroughly mixed solution from the beaker 9a standing in position C and to discharge it into the measurement beaker 17a standing in position D. As soon as the measurement beaker has been filled with the solution to be measured, the beaker transport device 18 takes it to the opening sample changer 19, which is equipped with a radiation shield, and to the lock of the latter, respectively. After closing of the outer lock of the sample changer 19 the measurement is started with the X-ray fluorescence spectrometer 20. Approximately at the same time, the beaker 9a is taken up by the beaker transport device 12, discharged over the drain 13, put on the chute or transfer device (not shown) leading to the waste storage system 14, and the beaker is disposed of.

After the end of the measurement, the measured values are stored and processed into the desired analytical values by a given program. The values are then visually displayed, for example, by recorders and/or printers which are associated with the computer. The sample changer 19 reopens, releasing the measurement beaker 17a, which is taken up by the beaker transport device 18 and moved to a position in which the pipette 7 used to transfer the volume to be measured into the measurement beaker 17a takes in the measured volume and discharges it over the drain 13, where the beaker transport device 12 takes it up and puts it onto the chute or transfer device leading to the waste storage system 14 for removal. Then pipette 7 is moved to the waste storage in the same way outlined above. Now, the sample preparation device 3 is free again to take the next sample container 1.

This design of the sample preparation device 3 can reduce the time required for preparation and measurement of a sample to determine the analytical values to at least one fourth the time previously required. The magazines hold a large number of pipettes and beakers, respectively, for instance, 50 or 100 each, so that numerous samples can be tested and thus further reducing the time required for sample preparation.

What is claimed is:

1. In a device for the determination of concentrations of fissile and/or fertile materials selected from the group consisting of thorium, uranium, neptunium, plutonium, americium, and curium in aqueous or organic solutions, the combination which comprises:
   a. closed means for receiving a sample to be analyzed;
   b. X-ray fluorescence spectrometry means for receiving emissions from the sample;
   c. electromechanically operated means located within said receiving means for preparing the sample, including means for transporting the sample, means for diluting the sample with known reagents or diluents, means for weighing the sample both before and after being diluted, means for moving the sample into a position to be X-rayed and means for disposing of the diluted sample after it has been analyzed; and
   d. automatic control means connected to said X-ray means and said sample preparing means for controlling the operation of each of said respective means.

2. In a device as defined in claim 1, wherein the control means includes a computer for storing the measured data and for determining and recording the analytic values in accordance with a fixed program.

3. In a device as defined in claim 1, wherein said sample preparing means further includes a movable magazine means for carrying a multitude of disposable pipettes and transporting the pipettes; said transporting means is connected to said receiving means for storing sample containers and transporting said containers individually into and through the sample preparing means; said means for diluting the sample includes pipetting means for taking aliquot samples out of the sample containers by use of the disposable pipettes, a first beaker magazine containing a multitude of beakers for accomodation of the pipetted aliquots of the samples, a second beaker magazine with a multitude of measurement beakers to hold volumes of liquid to be measured, at least two beaker transport means, a plurality of metering pumps each with an associated reservoir tank containing reagents or dilutents; said weighing means includes an electronic balance with a servo drive; and said disposing means includes a drain with a collection vessel for disposing of the measured amounts of liquid after they have been analyzed and a waste storage system for the spent disposable pipettes and beakers.

4. In a device as defined in claim 1, wherein the sample preparing means is located over the X-ray means and is connected to said X-ray means by said sample moving means.

5. In a method for determining concentrations of fissile and/or fertile materials in a group consisting of thorium, uranium, neptunium, plutonium, americium, and curium in aqueous or organic solutions, comprising the steps of: automatically preparing a sample to be analyzed by diluting the sample with known reagents or diluents, weighing the sample both before and after being diluted, remotely moving the sample into a position for being X-rayed, performing X-ray fluorescence spectrometry on the sample in order to analyze its contents, disposing of the diluted sample after it has been analyzed and controlling all of the operations by use of a computer with a fixed sequential program.

* * * * *